United States Patent
Saito et al.

(10) Patent No.: US 12,210,847 B2
(45) Date of Patent: Jan. 28, 2025

(54) SENTENCE GENERATION USING PRE-TRAINED MODEL WITH WORD IMPORTANCE AND FOCUS POINT

(71) Applicant: NIPPON TELEGRAPH AND TELEPHONE CORPORATION, Tokyo (JP)

(72) Inventors: Itsumi Saito, Tokyo (JP); Kyosuke Nishida, Tokyo (JP); Atsushi Otsuka, Tokyo (JP); Kosuke Nishida, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 208 days.

(21) Appl. No.: 17/435,018

(22) PCT Filed: Feb. 21, 2020

(86) PCT No.: PCT/JP2020/007132
§ 371 (c)(1),
(2) Date: Aug. 30, 2021

(87) PCT Pub. No.: WO2020/179512
PCT Pub. Date: Sep. 10, 2020

(65) Prior Publication Data
US 2022/0138438 A1 May 5, 2022

(30) Foreign Application Priority Data
Mar. 1, 2019 (JP) ................. 2019-037617

(51) Int. Cl.
*G06F 40/279* (2020.01)
*G06F 40/226* (2020.01)
(Continued)

(52) U.S. Cl.
CPC ........... *G06F 40/56* (2020.01); *G06F 40/226* (2020.01)

(58) Field of Classification Search
CPC ...... G06F 16/345; G06F 40/279; G06F 40/30; G06F 40/35; G06F 40/284; G06F 40/289; G06N 3/0475; G06N 3/08
(Continued)

(56) References Cited

U.S. PATENT DOCUMENTS

| 5,708,822 A * | 1/1998 | Wical ................... G06F 40/253 704/9 |
| 11,188,824 B2 * | 11/2021 | Strope ...................... G06N 5/04 |

(Continued)

FOREIGN PATENT DOCUMENTS

JP  2016118813 A  6/2016

OTHER PUBLICATIONS

Gehrmann et al. (2018) "Bottom-Up Abstractive Summarization" Proceedings of the 2018 Conference on Empirical Methodsnin Natural Language Processing, pp. 4098-4109.
(Continued)

*Primary Examiner* — Martin Lerner

(57) ABSTRACT

A sentence generation device has: an estimation unit for receiving input of a first sentence and a focus point related to generation of a second sentence to be generated based on the first sentence, and estimating importance of each word constituting the first sentence using a pre-trained model; and a generation unit for generating the second sentence based on the importance, and thus makes it possible to evaluate importance of a constituent element of an input sentence in correspondence with a designated focus point.

2 Claims, 10 Drawing Sheets

(51) Int. Cl.
*G06F 40/35* (2020.01)
*G06F 40/56* (2020.01)
*G06N 3/08* (2023.01)

(58) Field of Classification Search
USPC .......................................... 704/1, 9; 706/12
See application file for complete search history.

(56) References Cited

U.S. PATENT DOCUMENTS

| | | | | |
|---|---|---|---|---|
| 11,954,435 B2* | 4/2024 | Saito | ................... | G06F 40/279 |
| 2008/0040114 A1* | 2/2008 | Zhou | ................... | G06F 40/30 |
| | | | | 704/257 |
| 2008/0109425 A1* | 5/2008 | Yih | ................... | G06F 16/345 |
| | | | | 706/12 |
| 2011/0093258 A1* | 4/2011 | Xu | ................... | G06F 40/237 |
| | | | | 704/9 |
| 2012/0029908 A1* | 2/2012 | Takamatsu | ............ | G06F 40/30 |
| | | | | 704/9 |
| 2017/0132512 A1* | 5/2017 | Ioffe | ................... | G06N 3/04 |
| 2017/0169355 A1* | 6/2017 | Boyer | ................... | G06F 40/30 |
| 2018/0060722 A1* | 3/2018 | Hwang | ................... | G06N 3/045 |
| 2018/0365220 A1* | 12/2018 | Chakraborty | ........... | G06F 40/30 |
| 2019/0205372 A1* | 7/2019 | Li | ................... | G06F 40/253 |
| 2019/0384807 A1* | 12/2019 | Dernoncourt | ........ | G06F 40/169 |
| 2020/0081980 A1* | 3/2020 | Eisenberg | ............ | G06F 40/30 |
| 2020/0184012 A1* | 6/2020 | Stoyanovsky | .......... | G06F 40/30 |
| 2020/0242197 A1* | 7/2020 | Srinivasan | ............ | G06F 40/284 |
| 2022/0138239 A1* | 5/2022 | Saito | ................... | G06F 40/30 |
| | | | | 704/9 |
| 2022/0343076 A1* | 10/2022 | Saito | ................... | G06F 40/289 |
| 2022/0366140 A1* | 11/2022 | Saito | ................... | G06F 40/279 |
| 2023/0028376 A1* | 1/2023 | Saito | ................... | G06F 40/30 |
| 2023/0130902 A1* | 4/2023 | Saito | ................... | G06F 40/30 |
| | | | | 704/9 |

OTHER PUBLICATIONS

Nishikawa et al. (2015) "Query-dependent summary using document structure for Wikipedia articles" Proceedings of the 21st Annual Meeting of the Natural Language Processing Society, Mar. 16, 2015, pp. 589-592.

Wang et al. (2018) "Multi-Passage Machine Reading Comprehension with Cross-Passage Answer Verification" Proceedings of the 56th Annual Meeting of the Association for Computational Linguistics, Jul. 15, 2018, pp. 1918-1927.

Hu et al. (2018) "Reinforced Mnemonic Reader for Machine Reading Comprehension" Proceedings of the Twenty-Seventh International Joint Conference on Artificial Intelligence, Jul. 13, 2018, pp. 4099-4106.

Hsu et al. (2018) "A Unified Model for Extractive and Abstractive Summarization using Inconsistency Loss" Proceedings of the 56th Annual Meeting of the Association for Computational Linguistics, Jul. 15, 2018, pp. 132-141.

See et al. (2017) "Get To The Point: Summarization with Pointer-Generator Networks" Proceedings of the 55th Annual Meeting of the Association for Computational Linguistics, Jul. 30, 2017, pp. 1073-1083.

Bajaj et al. (2018) "MS MARCO: A Human Generated Machine Reading Comprehension Dataset" arXiv, Oct. 31, 2018.

* cited by examiner

SENTENCE GENERATION USING PRE-TRAINED MODEL WITH WORD IMPORTANCE AND FOCUS POINT

CROSS-REFERENCE TO RELATED APPLICATIONS

This application is a U.S. 371 Application of International Patent Application No. PCT/JP2020/007132, filed on 21 Feb. 2020, which application claims priority to and the benefit of JP Application No. 2019-037617, filed on 1 Mar. 2019, the disclosures of which are hereby incorporated herein by reference in their entireties.

TECHNICAL FIELD

The present invention relates to a sentence generation device, a sentence generation method, a sentence generation learning device, a sentence generation learning method, and a program.

BACKGROUND ART

Sentence summarization technology based on neural networks is progressing. The summarization technology is a technology by which input of text is received and a sentence for a predetermined purpose (e.g. a summary sentence) is generated based on a pre-trained neural network model.

For example, it has been reported that the summarization accuracy is increased by estimating a 1/0 model regarding whether or not source words are included in a summary at word level and weighting copy probability of the source words (e.g. NPL 1).

CITATION LIST

Non Patent Literature

[NPL 1] S. Gehrmann, Y. Deng, and A. Rush. Bottom-up abstractive summarization. In EMNLP, pages 4098{4109, 2018.

SUMMARY OF THE INVENTION

Technical Problem

However, the conventional technology has a problem in that, when the importance of each sentence or each word is evaluated in the case where an input sentence (source text) is summarized, a point of interest (hereinafter also referred to as a focus point) related to generation of a sentence to be output cannot be considered.

The present invention has been made in view of the foregoing, and an object of the present invention is to make it possible to evaluate the importance of a constituent element of an input sentence in correspondence with a designated focus point.

Means for Solving the Problem

To solve the above-described problem, a sentence generation device has: an estimation unit for receiving input of a first sentence and a focus point related to generation of a second sentence to be generated based on the first sentence, and estimating importance of each word constituting the first sentence using a pre-trained model; and a generation unit for generating the second sentence based on the importance.

Effects of the Invention

The importance of a constituent element of an input sentence can be evaluated in correspondence with a designated focus point.

DESCRIPTION OF EMBODIMENTS

Figure 1:
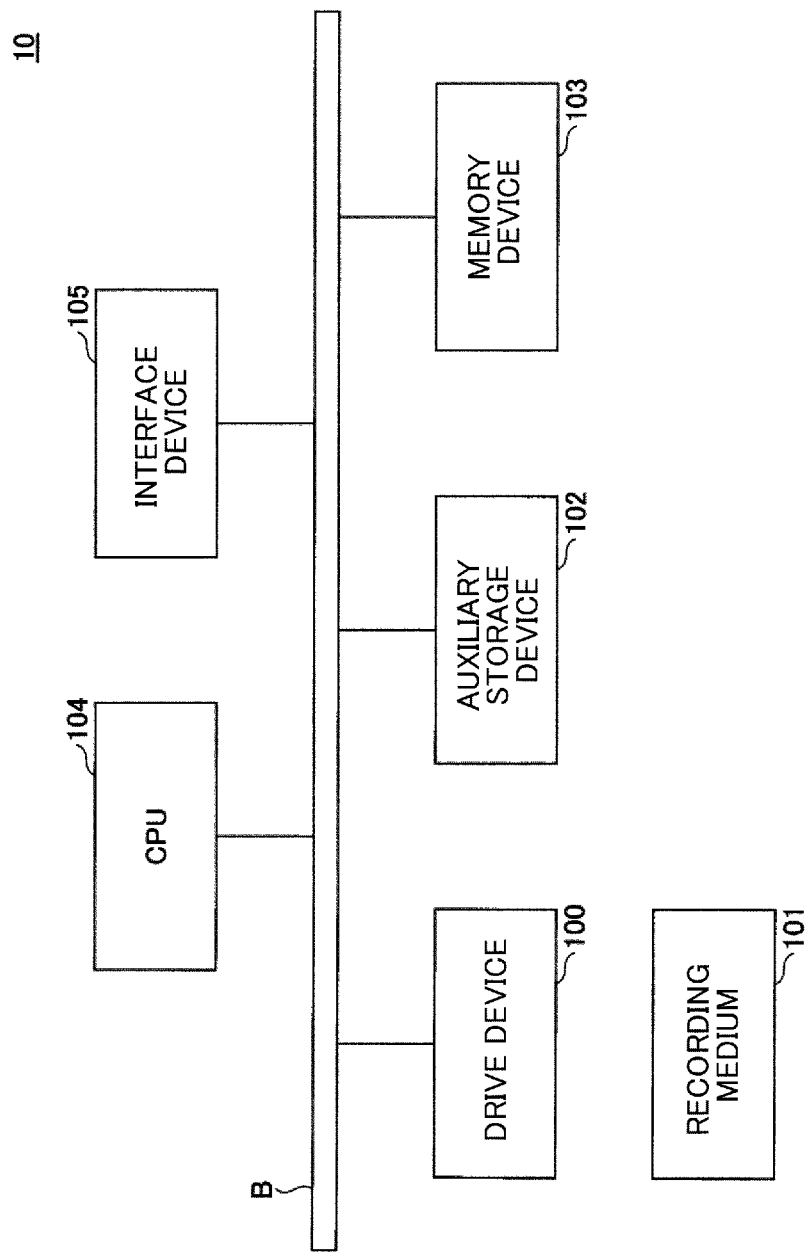
FIG. 1 is a diagram showing an example hardware configuration of a sentence generation device 10 according to a first embodiment.

Hereinafter, embodiments of the present invention will be described with reference to the drawings. First, problems to be addressed in the present embodiment are defined as follows.

[Problem 1 Query-Independent Summary]

Source text $X^C$ and an output length L are received, and a summary $Y^L$ with consideration given to the output length L is generated.

[Problem 2 Query-Dependent Summary]

A query $X^Q$, source text $X^C$, and an output length L are received, and a query-dependent summary $Y^L$ for which the output length L is considered is generated. Note that the query refers to a character string indicating a point of interest (focus point) regarding generation of target text (an output sentence). In the present embodiment, the focus point of the summary is the query.

Note that each of XC, XQ, YL, and Y is a word string, and it is assumed that $XC=xC_1, \ldots, xC_n$, $XQ=xQ_1, \ldots, xQ_m$, $YL=yL_1, \ldots, yL_k$, and $Y=y_1, \ldots, y_{k'}$. Note that n denotes the number of words (the length of the word string) included in the source text XC. m denotes the number of words (the length of the word string) included in the query XQ. k denotes the number of words (the length of the word string) included in the summary YL. k' denotes the number of words (the length of the word string) included in the summary Y when the output length is not considered.

1.1 Overview of the Present Embodiment

A model disclosed in the present embodiment roughly consists of two constituent elements (a content selection model and a generation model). The content selection model is a model for predicting words that are to be included in a summary, and the generation model generates words while considering a predicted value of the content selection model. The framework of the present embodiment is a configuration in which both query-dependent and independent summaries can be dealt with only by replacing the content selection model.

1.2 Content Selection Model

The content selection model predicts probabilities $p^{ext}_1, \ldots, p^{ext}_n \in [0, 1]$ regarding whether each of the words $x^C_1, \ldots, x^C_n$ of the source text is included in the summary sentence. $p^{ext}_t$ closer to 1 indicates that a t-th word $x^C_t$ is more likely to be included in the summary sentence. The same problem settings have also been proposed in existing studies. In the present embodiment, NPL 1 is referenced in the case of a query-independent summary, and "Y. Wang, K. Liu, J. Liu, W. He, Y. Lyu, H. Wu, S. Li, and H. Wang. Multi-passage machine reading comprehension with cross-passage answer verication. In ACL (1), pages 1918-1927, 2018." (hereinafter, "Reference Literature 1") is referenced in the case of a query-dependent summary. However, known technologies disclosed in literature other than NPL 1 or Reference Literature 1 may also be referenced.

[1.2.1 Query-Dependent Summary]

Initially, word embedding sequences $e^C_1, \ldots, e^C_n$ and $e^Q_1, \ldots, e^Q_m$ of a source text word string $X^C$ and a query word string $X^Q$ are encoded using a BiGRU in a d-dimensional hidden state.

$$u^Q_t = \text{BiGRU}(u^Q_{t-1}, e^Q_t) \quad (1)$$

$$u^C_t = \text{BiGRU}(u^C_{t-1}, e^C_t) \quad (2)$$

Next, matching between the query and the source text is performed using the above information. Here, the model in "M. Hu, Y. Peng, Z. Huang, X. Qiu, F. Wei, and M. Zhou. Reinforced mnemonic reader for machine reading comprehension. In IJCAI, pages 4099-4106, 2018." (hereinafter, "Reference Literature 2") is used in the matching. The model in Reference Literature 2 expresses matching mainly using three modules, which are the Interactive alignment, the Self alignment, and the Evidence collection.

<Interactive Alignment>

In this module, $$(u^C \in \mathbb{R}^{2d \times n}, u^Q \in \mathbb{R}^{2d \times m})$$

is received as input (n and m denote the sentence lengths (i.e. the number of words arranged) of the source text and the query, respectively), and $$o \in \mathbb{R}^{2d \times n}$$

is output.

To simplify the description, hereinafter, the input is denoted as (A, B). This module is constituted by two sub-modules, which are an attention match and a semantic fusion. Initially, an attention match (A, B) obtains, using the attention of the respective vectors, a weighted vector $$h_t \in \mathbb{R}^{2d}$$

at each position t.

$$h_t = \sum_j \alpha_{tj} B_j \quad (3)$$

$$\alpha_{tj} = \frac{\exp(A_t \cdot B_j)}{\sum_j \exp(A_t \cdot B_j)} \quad (4)$$

Next, a semantic fusion $(A_t, h_t)$ calculates a vector $$h_t \in \mathbb{R}^{2d}$$

considering interaction between $A_t$ and $h_t$.

$$\tilde{A}_t = f(W_r[A_t; h_t; A_t \circ h_t; A_t - h_t]) \quad (5)$$

$$g_t = \sigma(W_g[A_t; h_t; A_t \circ h_t; A_t - h_t]) \quad (6)$$

$$o_t = g \circ \tilde{A}_t + (1-g) \circ A_t \quad (7)$$

σ denotes a sigmoid function. f denotes ReLU.

$$W_r \in \mathbb{R}^{2d \times 8d}, W_g \in \mathbb{R}^{2d \times 8d}$$

is a learning parameter. [;] denotes an operator for vector concatenation.

<Self Alignment>

The model structure is shared with the Interactive alignment. That is to say, the Interactive alignment performs the same processing as that of the Interactive alignment using (o, o), instead of $(u^C, u^Q)$, as input (A', B'), and obtains output o'.

<Evidence Collection>

This module obtains $$u \in \mathbb{R}^{2d \times n}$$

with respect to the output o' of the Self alignment, using a BiGRU.

$$u_t = \text{BiGRU}(u_{t-1}, o_t) \quad (8)$$

Lastly, a two-layer feedforward network is applied, and a one-dimensional word selection score (importance) is output for each word of the source text.

$$p^{ext}_t = \sigma(w_2^\top f(W_1 u_t + b_1) + b_2) \quad (9)$$

Here, $$W_1 \in \mathbb{R}^{d \times 2d}, b_1 \in \mathbb{R}^d, w_2 \in \mathbb{R}^{2d}, b_2 \in \mathbb{R}$$

is a learning parameter.

[1.2.2 Query-Independent Summary]

In the case of a query-independent summary, no query exists, but important words need to be selected for the entire source text, and therefore label prediction for each word is performed while considering information regarding the entire source text. Initially, the source text is encoded using a BiLSTM.

$$u^C_t = \text{BiLSTM}(u^C_{t-1}, e^C_t) \quad (10)$$

Instead of attention match in the case of a query-dependent summary, a document-level vector $u^{Cd}_t$ is obtained using $u^C_t$.

$$u^{Cd}_t = \sum_j \alpha_{tj} u^C_j \quad (11)$$

$$\alpha_{tj} = \frac{\exp(w_d \cdot u^C_t)}{\sum_j \exp(w_d \cdot u^C_j)} \quad (12)$$

Here, $$w_d \in \mathbb{R}^{2d}$$

is a learning parameter. Next, input (A, B)=$(u^C_t, u^{Cd}_t)$ is applied to the semantic fusion. Thereafter, the formula (8) is not applied, and the same processing as that in the case of a query-dependent summary is performed except that $v_t=o_t$.

In the case of a query-dependent summary, modeling is performed while considering the correlation between the query and the source text, whereas, in the case of a query-independent summary, modeling is performed while considering both document-level vectors and word-level vectors.

[1.2.3 Model that Considers Output Length]

When considering the control of the output length, it is desirable that the output itself of content selection changes depending on the length. For example, it is desired to change the output distribution itself of the content selection model between when 10 words are to be output and when 30 words are to be output, and therefore modeling depending on the number of output words is performed. Specifically, as embedding corresponding to the output length L, $e^L$ is concatenated with the input vector $e^C$ in the formula (2) as follows:

$$u_t^C = \text{BiGRU}(u_{t-1}^C, [e_t^C; e^L]) \quad (13)$$

As output length information regarding a correct answer to be given at this time, the length of a reference summary is given. $e^L$ is a learning parameter and is obtained by converting the output length designated as a scalar to a vector in a predetermined number of dimensions (in general, 100 dimensions, for example, are used). Parameters at the time of the conversion are obtained by learning.

That is to say, in the model that considers the output length, in the case of a query-dependent summary, the formula (2) is replaced with the formula (13). In the case of a query-independent summary, the formula (10) is replaced with the formula (13).

[1.2.4 Creation of Training Data]

As for the content selection model, no correct-answer data exists, and therefore pseudo correct-answer data is automatically generated using a method similar to those of existing studies (NPL 1 and "W.-T. Hsu, C.-K. Lin, M.-Y. Lee, K. Min, J. Tang, and M. Sun. A unified model for extractive and abstractive summarization using inconsistency loss. In ACL (1), pages 132-141, 2018." (hereinafter, "Reference Literature 3").

Specifically, first, a pseudo sentence correct-answer label is given to each sentence of the source text using a Recall score of Rouge-L at the sentence level, similarly to Reference Literature 3. Then, with a set of sentences with a sentence label 1 as pseudo source text, word alignment is calculated using DP matching between the reference summary and the pseudo source text. A word selection label 1 is given for matched words, and a word selection label 0 is given for other words. When training the content selection model, training may be performed with a correct-answer label r as the word selection label.

1.3 Combining of Content Selection Model and Generation Model

The present embodiment uses a combined attention (Reference Literature 3) in which the attention probability of the base model of "A. See, P. J. Liu, and C. D. Manning. Get to the point: Summarization with pointer-generator networks. In ACL (1), pages 1073-1083, 2017." is weighted with the output $p^{ext}_t$ of the content selection model. Furthermore, the output length is also controlled in the generation model.

[4.3.1 Generation Model]

As a base model for the generation model, a pointer-generator model (Reference Literature 3), which is used in many summarization models, is used. However, any of known models other than the pointer-generator model may be used as the base model.

In the pointer-generator model, the generation probability of a summary Y=$y_1, \ldots, y_k$ is defined as follows:

$$p(y_j|y_{1:j-1},x) = p(z_j=1|y_{1:j-1},x) \times p(y_j|z_j=1,y_{1:j-1},x) + p(z_j=0|y_{1:j-1},x) \times p(y_j|z_j=0,y_{1:j-1},x)$$

Here, p(z) denotes the probability of whether $y_j$ is copied from the source text. Also, the probability $p(y_j|z_j=1, y1_{:j-1}, x)$ of the case where $y_j$ with z=1 is copied is defined as:

$$p(y_j|z_j=1, y_{1:j-1}, x) = \sum_{t:x_t^C=y_j} a_{jt} \quad (14)$$

based on an attention distribution $a_j$ at a time j. When the decoder state at the time j is denoted as $s_j$, the following formulas hold:

$$a_{jt} = \exp(g_{jt})/(\Sigma_{t'} \exp(g_{jt'})) \quad (15)$$

$$g_{jt} = w_a^\top \tan h(W_u u_t + W_s s_j + b_a) \quad (16)$$

$$w_a \in \mathbb{R}^d, W_u \in \mathbb{R}^{d \times 2d}, W_s \in \mathbb{R}^{d \times 2d}, b_a \in \mathbb{R}^d$$

is a learning parameter.

[1.3.2 Combined Attention]

The Combined attention replaces the formula (15) with the following formula (17) and calculates an attention distribution to be substituted into the formula (14).

$$\tilde{a}_j = \frac{a_j p_j^{ext}}{\sum_j a_j p_j^{ext}} \quad (17)$$

[1.3.3 Model that Considers Output Length]

A model that considers the output length on the decoder side is formalized using length embedding, as is dealt with in the existing studies. The present embodiment uses a method of concatenating remaining length embedding to be output with each input of the decoder. Specifically, a length embedding vector $$\tilde{e}^l$$

is combined with the input of LSTM of the decoder, as follows:

$$h_t = \text{LSTM}(h_{t-1}, [e_t^x; \tilde{e}^l]) \quad (18)$$

Here, l=max((L−t), 0). Note that $$\tilde{e}^l$$

is a learning parameter other than $e^L$ that is used in the content selection.

1.4 Training

[1.4.1 Pre-Training and Fine Tuning]

The content selection model and the base model (generation model) are pre-trained in advance using respective objective functions. Thereafter, the content selection model is fixed, and a generation model in which the formula (15) is replaced with the formula (17) is trained. The source text $X^C$, the correct-answer label r of each word included in the source text $X^C$ (a label indicating whether or not the word is included in the target text (output sentence)), the target text Y or $Y^L$ (in the case of considering the output length L), the output length L in the case of considering the output length, and the query $X^Q$ in the case of considering the query are input as training data to the models during the training.

[1.4.2 Objective Functions]

The objective functions of the content selection model and the generation model are denoted as $L_{ext}$ and $L_{gen}$, respectively. The content selection model, which is a binary identification problem for each word, is a binary cross-entropy function, and the generation model is defined similarly to a general language model.

$$L_{ext} = -\frac{1}{N} \sum_{n=1}^{N} \{r \log p^{ext} + (1-r)\log(1 - p^{ext})\}$$

$$L_{gen} = -\frac{1}{N} \sum_{n=1}^{N} \sum_{j=1}^{J} \log p(y_j | y_{1:j-1}, x)$$

2 Sentence Generation Device 10

Next, a sentence generation device 10 that realizes the above-described content selection model and generation unit will be described. FIG. 1 is a diagram showing an example hardware configuration of the sentence generation device 10 according to the first embodiment. The sentence generation device 10 in FIG. 1 has a drive device 100, an auxiliary storage device 102, a memory device 103, a CPU 104, an interface device 105, and so on, which are connected to each other by a bus.

A program that realizes processing performed in the sentence generation device 10 is provided by a recording medium 101, which is a CD-ROM or the like. Upon the recording medium 101 in which the program is stored being set to the drive device 100, the program is installed in the auxiliary storage device 102 from the recording medium 101 via the drive device 100. However, the program need not necessarily be installed from the recording medium 101, and may alternatively be downloaded from other computers via a network. The auxiliary storage device 102 stores the installed program, and also stores necessary files, data, or the like.

If an instruction to start the program is given, the memory device 103 loads the program from the auxiliary storage device 102 and stores the loaded program. The CPU 104 performs functions of the sentence generation device 10 in accordance with the program stored in the memory device 103. The interface device 105 is used as an interface for connecting to the network.

Figure 2:
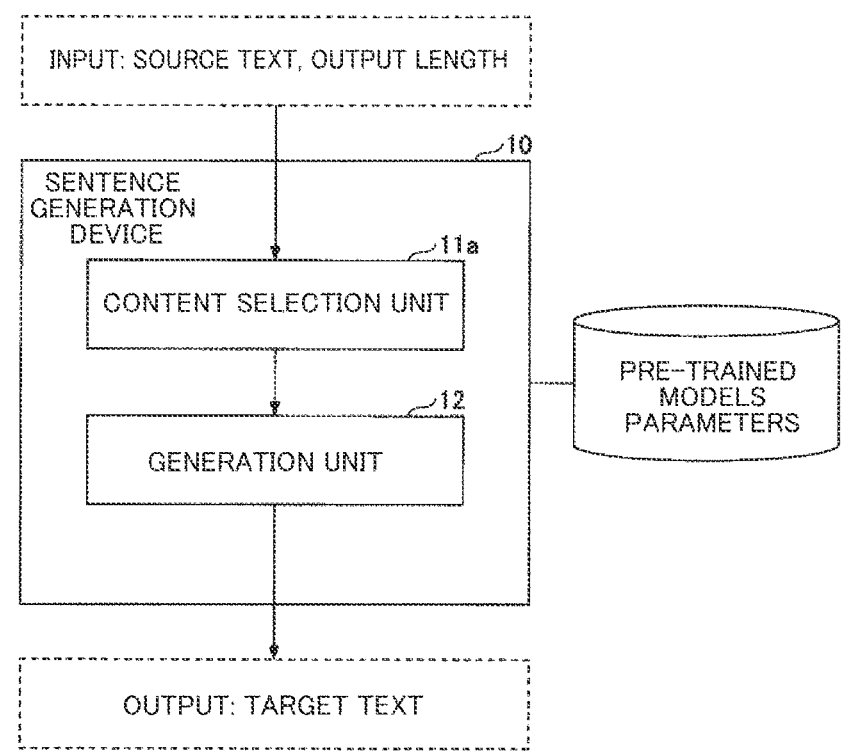
FIG. 2 is a diagram showing an example functional configuration of the sentence generation device 10 according to the first embodiment.

FIG. 2 is a diagram showing an example functional configuration of the sentence generation device 10 according to the first embodiment. As shown in FIG. 2, the sentence generation device 10 has a content selection unit 11a and a generation unit 12. These models are realized by processing that one or more programs installed in the sentence generation device 10 cause the CPU 104 to perform.

In the first embodiment, the input to the sentence generation device 10 is the source text $X^C$ and the output length L, and the output from the sentence generation device 10 is the summary $Y^L$ with consideration given to the output length L. That is to say, the sentence generation device 10 of the first embodiment realizes a query-independent summary with the output length L designated.

The content selection unit 11a estimates the importance of each constituent element (each sentence or each word) of an input sentence (source text $X^C$) using the content selection model (neural network) that has been trained using the method described in [1.4 Training].

The generation unit 12 generates a target text (the summary sentence $Y^L$) based on the results of estimation performed by the content selection unit 11a, using the generation model (neural network) that has been trained using the method described in [1.4 Training]

Figure 3:
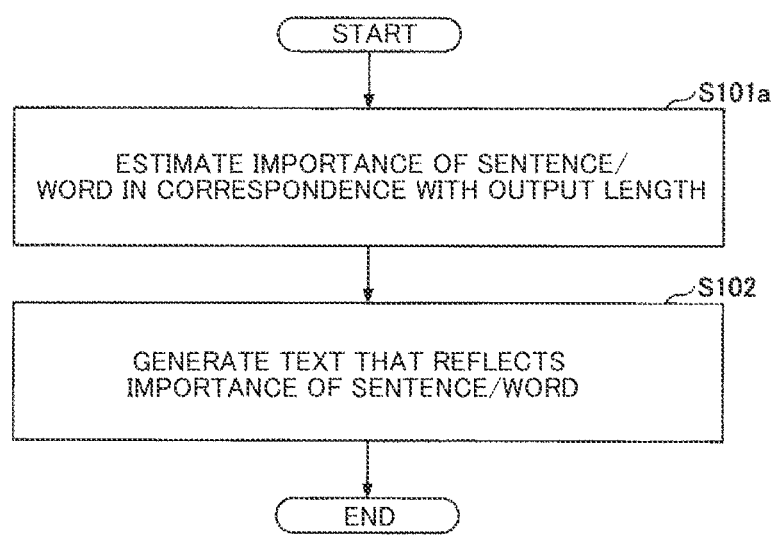
FIG. 3 is a flowchart for illustrating an example of a processing procedure performed by the sentence generation device 10 according to the first embodiment.

FIG. 3 is a flowchart for illustrating an example of a processing procedure performed by the sentence generation device 10 according to the first embodiment.

In step S101a, the content selection unit 11a estimates the importance of each sentence or each word that constitutes the source text $X^C$, in correspondence with the input output length L.

Figure 4:
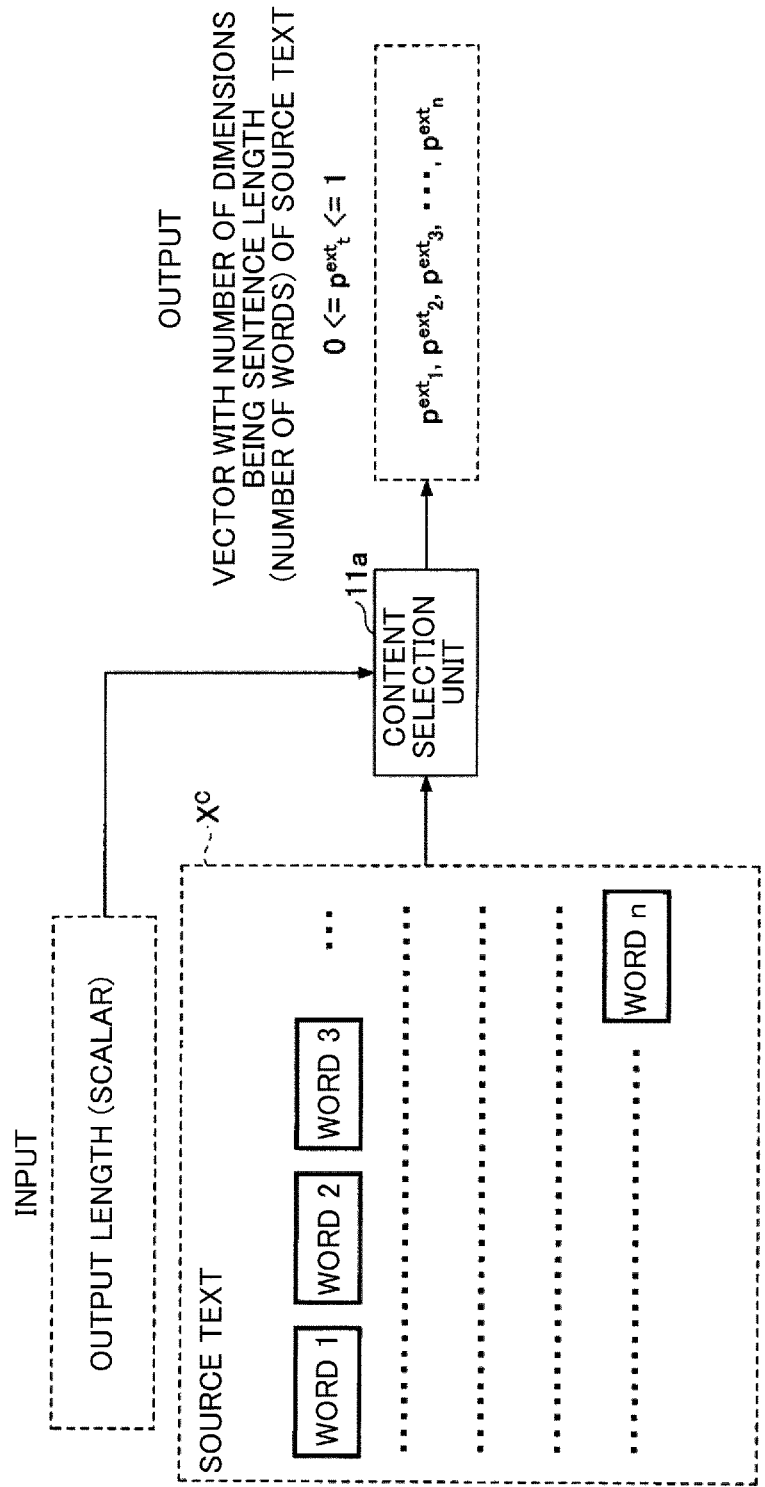
FIG. 4 is a diagram for illustrating estimation of importance for each word.

FIG. 4 is a diagram for illustrating the estimation of the importance for each word. FIG. 4 shows an example in which n words are included in the source text $X^C$. In this case, the content selection unit 11a calculates an importance $p^{ext}_t$ of each of the n words using the method described in [1.2.3 Model that Considers Output Length] and [1.2.2 Query-Independent Summary].

Figure 5:
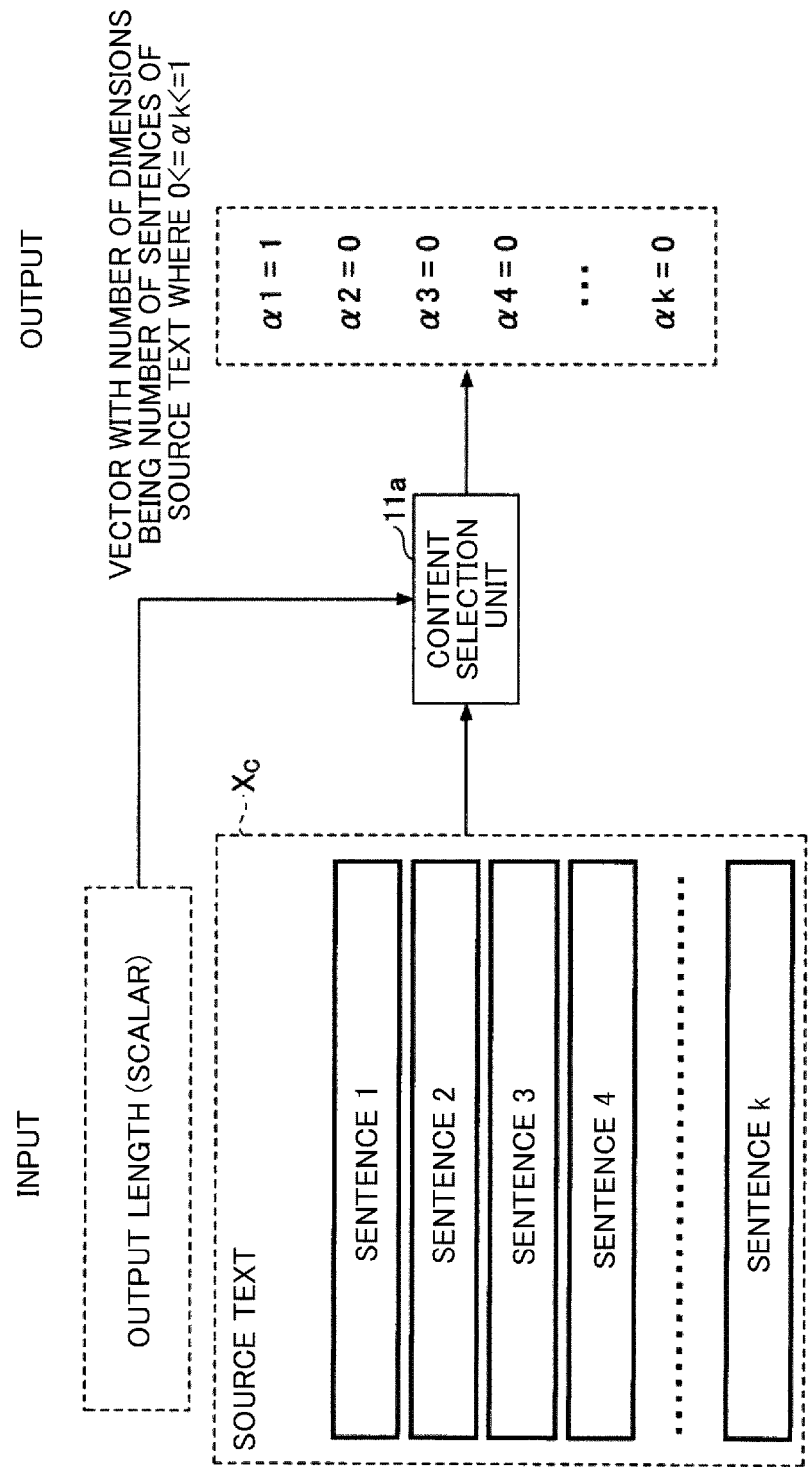
FIG. 5 is a diagram for illustrating estimation of importance for each sentence.

FIG. 5 is a diagram for illustrating the estimation of the importance for each sentence. FIG. 5 shows an example in which k sentences are included in the source text $X^C$. In this case, the content selection unit 11a calculates an importance $\alpha$ of each of the k sentences. At this time, the method for inputting the source text $X^C$ in the case where the estimation is performed for each sentence may be the same as that in the case where the estimation is performed for each word ([1.2.3 Model that Considers Output Length]). Reference Literature 3 discloses a content selection model that receives input of source text and outputs the importance of each sentence. That is to say, the value that is output as Sentence-Level Attention in FIG. 3 in Reference Literature 3 corresponds to the importance of a sentence. Accordingly, the importance of each sentence can be estimated while considering the output length L by concatenating Embedding ($e^L$) with the output length L, with Embedding or a hidden vector of the source text of the content selection model in Reference Literature 3 (e.g. using the output of a GRU that is a Sentence-level RNN in Reference Literature 1 instead of $u^C_{t-1}$ in the formula (13)).

Subsequently, the generation unit 12 performs processing described in [1.3 Combining of Content Selection Model and Generation Model] based on the importance of each sentence or each word that is the output from the content selection unit 11a and the vector sequence (v in the formula (8)) of the source text $X^C$, and generates text (the summary $Y^L$) corresponding to the output length L (S102).

Figure 6:
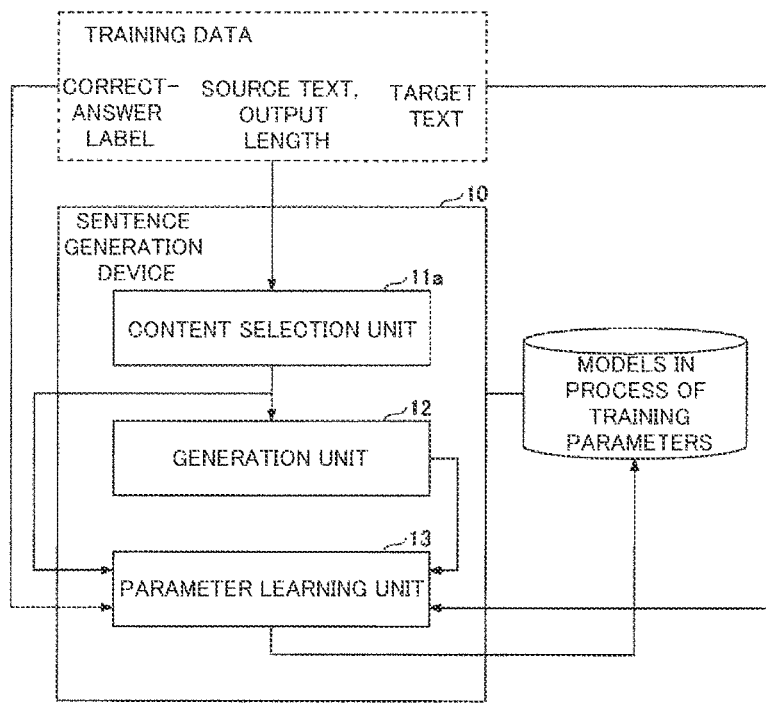
FIG. 6 is a diagram showing an example functional configuration of the sentence generation device 10 during training.

Subsequently, the training will be described. FIG. 6 is a diagram showing an example functional configuration of the sentence generation device 10 during the training. In FIG. 6, the same portions as those in FIG. 5 are assigned the same reference numerals, and description thereof is omitted.

During the training, the sentence generation device 10 further has a parameter learning unit 13. The parameter learning unit 13 learns parameters for the machine learning models (the content selection model and the generation model) using an error between the importance of each word estimated by the content selection unit 11a and the label (0 or 1) of the training data indicating whether or not the word is included in an output sentence that is a correct answer, and an error between an output sentence generated by the generation unit 12 and target text (of the training data) that is the correct answer. Note that the details of the training are as described in [1.4 Training].

As described above, according to the first embodiment, the importance of a constituent element of an input sentence can be evaluated in correspondence with a designated output length.

Next, the second embodiment will be described. In the second embodiment, differences from the first embodiment will be described. The points not particularly mentioned in the second embodiment may be the same as those in the first embodiment.

Figure 7:
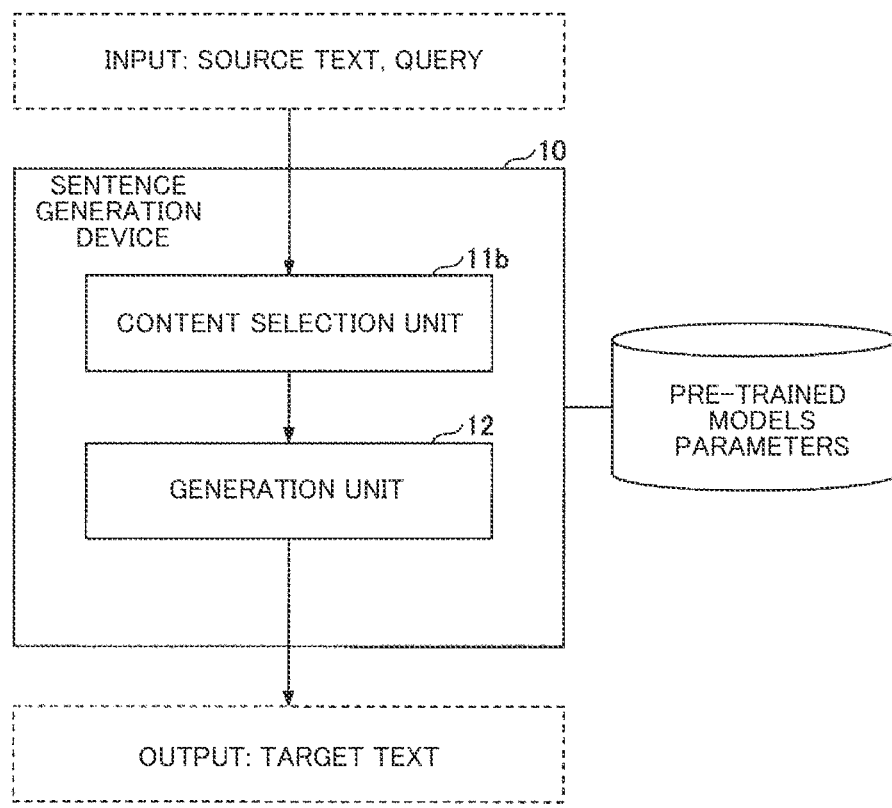
FIG. 7 is a diagram showing an example functional configuration of the sentence generation device 10 according to a second embodiment.

FIG. 7 is a diagram showing an example functional configuration of the sentence generation device 10 according to the second embodiment. In FIG. 7, the same portions as those in FIG. 2 are assigned the same reference numerals, and description thereof is omitted.

In FIG. 7, the sentence generation device 10 has a content selection unit 11b instead of the content selection unit 11a. The content selection unit 11b is realized by processing that one or more programs installed in the sentence generation device 10 cause the CPU 104 to perform.

In the second embodiment, the input to the sentence generation device 10 is the source text $X^C$ and the query $X^Q$, and the output from the sentence generation device 10 is the summary $Y^L$ with consideration given to the query $X^Q$. That is to say, the sentence generation device 10 of the second embodiment realizes a query-dependent summary for which the output length L is not designated.

Figure 8:
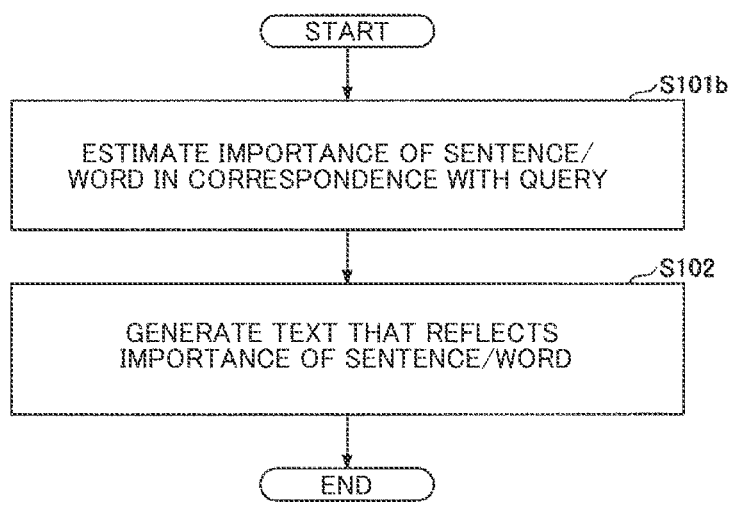
FIG. 8 is a flowchart for illustrating an example of a processing procedure performed by the sentence generation device 10 according to the second embodiment.

FIG. 8 is a flowchart for illustrating an example of a processing procedure performed by the sentence generation device 10 according to the second embodiment. In FIG. 8, the same steps as those in FIG. 3 are assigned the same step numbers, and description thereof is omitted.

In step S101b, the content selection unit 11b estimates the importance of each sentence or each word that constitutes the source text $X^C$ in correspondence with the input query $X^Q$, by performing processing described in [1.2.1 Query-Dependent Summary].

Note that in the second embodiment, the functional configuration during the training may be the same as that shown in FIG. 6. However, the training data includes the query instead of the output length. Accordingly, the query is used, instead of the output length, in the training.

As described above, according to the second embodiment, a sentence can be generated with respect to an input sentence, in correspondence with a designated query.

Next, the third embodiment will be described. In the third embodiment, differences from the first embodiment will be described. The points not particularly mentioned in the third embodiment may be the same as those in the first embodiment.

Figure 9:
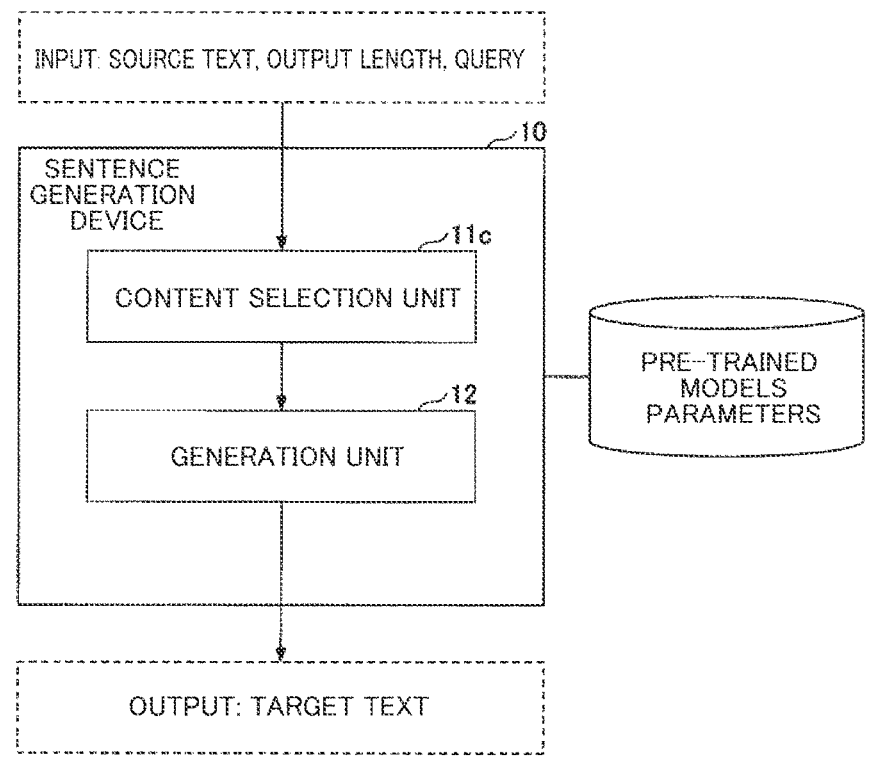
FIG. 9 is a diagram showing an example functional configuration of the sentence generation device 10 according to a third embodiment.

FIG. 9 is a diagram showing an example functional configuration of the sentence generation device 10 according to the third embodiment. In FIG. 9, the same portions as those in FIGS. 2 and 7 are assigned the same reference numerals, and description thereof is omitted.

In FIG. 9, the sentence generation device 10 has a content selection unit 11c instead of the content selection unit 11a. The content selection unit 11c is realized by processing that one or more programs installed in the sentence generation device 10 cause the CPU 104 to perform.

In the third embodiment, the input to the sentence generation device 10 is the source text $X^C$, the output length L, and the query $X^Q$, and the output from the sentence generation device 10 is the summary $Y^L$ with consideration given to the query $X^Q$. That is to say, the sentence generation device 10 of the third embodiment realizes a query-dependent summary for which the output length L is designated.

Figure 10:
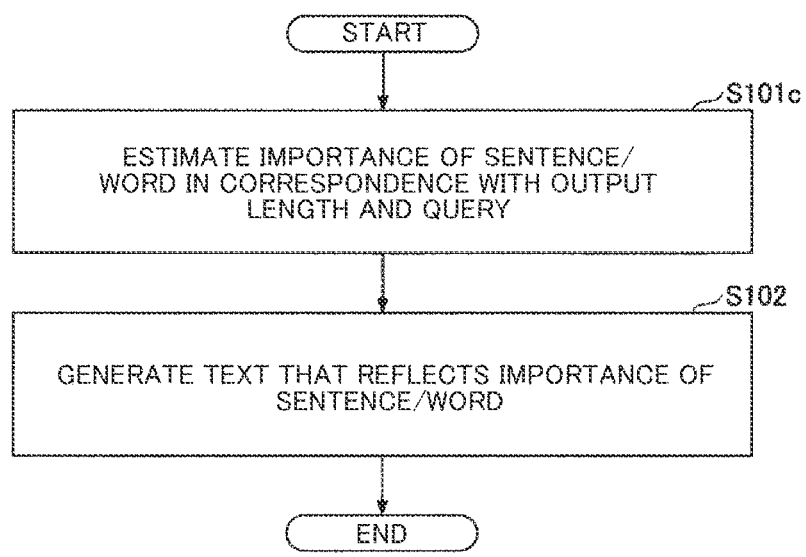
FIG. 10 is a flowchart for illustrating an example of a processing procedure performed by the sentence generation device 10 according to the third embodiment.

FIG. 10 is a flowchart for illustrating an example of a processing procedure performed by the sentence generation device 10 according to the third embodiment. In FIG. 10, the same steps as those in FIG. 3 are assigned the same step numbers, and description thereof is omitted.

In step S101c, the content selection unit 11c estimates the importance of each sentence or each word that constitutes the source text $X^C$ in correspondence with the input output length L and query $X^Q$ by performing processing described in [1.2.3 Model that Considers Output Length] and [1.2.1 Query-Dependent Summary].

Note that in the third embodiment, the functional configuration during the training may be the same as that shown in FIG. 6. However, the training data further includes the query.

As described above, according to the third embodiment, a sentence can be generated with respect to an input sentence, in correspondence with a designated output length and query.

3 Evaluation Experiments 3.1. Experimental Data

CNN/DM was used that is generally used as query-independent data in summary tasks. Since no large-scale query-dependent data exists, Q&A task data in MS-MARCO3.1 ("P. Bajaj, D. Campos, N. Craswell, L. Deng, J. Gao, X. Liu, R. Majumder, A. McNamara, B. Mitra, T. Nguyen, M. Rosenberg, X. Song, A. Stoica, S. Tiwary, and T. Wang. MS MARCO: A human generated machine reading comprehension dataset. CoRR, abs/1611.09268v3, 2018." (hereinafter, "Reference Literature 4")) was used. The Q&A task data is data obtained by manually creating an answer for a query based on target source text (10 Bing search results). Since many words in the answer are extracted from the source text, it is considered as a setting of a query-dependent summary. In this experiment, a combination of the aforementioned 10 pieces of text are to be summarized. Since the original data of MS-MARCO is large-scale, in this experiment, 300,000 pieces and 10,000 pieces of the original data were randomly sampled and used as training data and evaluation data, respectively. The overview of each data is shown in Table 1.

TABLE 1

The number of pieces of data used in the experiment

| | CNN/DM | MS-MARCO |
|---|---|---|
| train | 287,113 | 300,000 |
| validation | 13,368 | 10,000 |
| test | 11,490 | — |

3.2 Experiment Settings

Regarding query-independent data, training was performed with the source text length and the summary text length being truncated to 400 words and 100 words, respectively, during the training, similarly to the conventional summarizing method. The upper limit of the number of words at the time of the test was 120. Regarding query-dependent data, the maximum length of the source text during the training was 800 words. Adagrad was used as an optimization method, and the initial learning rate during pre-training and the initial learning rate during fine tuning were set respectively to 0.15 and 0.05. The initial accumulator value was 0.1, similarly to the existing studies. For word embedding, a 100-dimensional vector of Glove was used and fixed. The number of hidden layers in the GRU and the LSTM was set to 256. The length embedding $e^L$, $\tilde{e}^l$ was 100-dimensional. The dropout rate was 0.3.

3.3 Evaluation Method

The present embodiment is characterized in that query dependency and the output length in the content selection model are controlled. First, in section 3.4.1, the accuracy when the content selection and the generation model in the case of performing these controls are combined is evaluated using Rouge-L. Next, section 3.4.2 shows the results of analyzing the output length control focusing on the query-dependent summaries for convenience.

3.4 Results and Considerations

[3.4.1 Evaluation Regarding Summarization Accuracy with Controlled Output Length]

"Did content selection+generation model summarize important information in correspondence with the designated output length?" Table 2 shows Rouge-L scores in the case of controlling the output length of the entire proposed model (content selection+generation)

TABLE 2

Evaluation results regarding Rouge-L for query-independent summaries (CNN/DK)/independent summaries (MS-MARCO)

| | CNN/DM | | | MS-MARCO | | |
|---|---|---|---|---|---|---|
| Output Length | Identification Rate | Reproducibility | F value | Identification Rate | Reproducibility | F value |
| 10 | 58.6 | 8.43 | 8.62 | 36.3 | 20.9 | 19.4 |
| 20 | 50.3 | 17.5 | 18.9 | 27.6 | 31.0 | 24.2 |
| 30 | 47.8 | 23.3 | 25.5 | 23.2 | 36.2 | 22.9 |
| gold | 41.9 | 32.4 | 34.2 | 41.7 | 38.8 | 39.5 |

First, in both cases of query-dependent and independent summaries, the shorter the output length, the higher the identification rate, and the longer the output length, the higher the reproducibility. Based on this, it can be understood that more important information is included in the summaries. It can be understood from these results that the control of the content selection and the length is also effectively functioning in the query-dependent setting. In the case of CNN/DM, the longer the output length, the higher the F value of Rouge. On the other hand, in the case of MS-MARCO, the F value is highest when the output length constraint is 20. This is due to the length of summary sentences of the original data. Such behavior is exhibited since the average length of summaries is long in the case of CNN/DM, and the average length of summaries is short in the case of MS-MARCO.

"Is the output length control in the content selection model effective?" Table 3 shows the results in the case where, in query-independent summaries (CNN/DM), the control (gold condition) of the output length is considered in the content selection model in addition to the generation model and in the case where it is not considered.

TABLE 3

Effects of output length control in content selection (CNN/DM)

| Content Selection | R-1 | R-2 | R-L |
|---|---|---|---|
| Output length not controlled | 38.4 | 16.5 | 33.9 |
| Output length controlled | 38.7 | 17.1 | 34.2 |

It can be understood that the Rouge scores is improved by controlling the output length in the content selection model.

[3.4.2 Analysis Regarding Output Length Control for Query-Dependent Summaries]

"Did the sentence generation device 10 output summaries in accordance with the designated output length?" Table 4 shows designated output lengths and actual output lengths.

TABLE 4

The designated number of words and the average output length of the system

| Designated number of words | 10 | 20 | 30 |
|---|---|---|---|
| Average output length | 7.0 | 17.0 | 27.0 |

It was understood that the sentence generation device 10 can output lengths close to the designated lengths, and understood that the output length can also be appropriately controlled in the query-dependent setting. In particular, since in MS-MARCO many of the outputs are short, namely about one sentence, it is conceivable there are many short-length variations and output length information has been successfully learned.

Note that although the above embodiments define the content selection model for the query, the query-dependent content selection model of the present embodiment can be extended to a content selection model with various conditions regarding a focus point for the target text (output sentence), such as a keyword other than the query and interactive context.

Note that, in the present embodiment, the content selection unit 11b and the content selection unit 11c are examples of an estimation unit. The source text is an example of a first sentence. The target text is an example of a second sentence. The parameter learning unit 13 is an example of a learning unit. The sentence generation device 10 is an example of a sentence generation device and a sentence generation learning device.

Although the embodiments of the present invention have been described in detail, the present invention is not limited to those specific embodiments, and various modifications and changes may be made within the scope of the gist of the present invention described in the claims.

REFERENCE SIGNS LIST

10 Sentence generation device
11a Content selection unit
11b Content selection unit
11c Content selection unit
12 Generation unit
13 Parameter learning unit
100 Drive device
101 Recording medium
102 Auxiliary storage device
103 Memory device
104 CPU
105 Interface device

The invention claimed is:

1. A sentence generation learning device comprising a processor configured to execute operations comprising:

receiving input of a first sentence and a focus point related to generation of a second sentence to be generated based on the first sentence, wherein the focus point as represented in character string form is distinct from the first sentence and a part of the first sentence;

estimating importance of each word constituting the first sentence using a machine learning model according to the focus point;

generating the second sentence based on the importance; and learning a parameter of the machine learning model using:

a first error between the estimated importance of a word according to the focus point and a label indicating whether or not the word is included in an output sentence that is a correct answer, and a second error between the generated second sentence and the output sentence that is the correct answer.

2. The sentence generation learning device according to claim 1, wherein the machine learning model includes a model trained using training data, and the training data include an input sentence, the output sentence, the focus point, and the label.

* * * * *